United States Patent
Wu et al.

(10) Patent No.: US 10,467,293 B2
(45) Date of Patent: Nov. 5, 2019

(54) SCALABLE DISTRIBUTED COMPUTING SYSTEM FOR DETERMINING EXACT MEDIAN AND OTHER QUANTILES IN BIG DATA APPLICATIONS

(71) Applicant: Aetna Inc., Hartford, CT (US)

(72) Inventors: Zhijun Wu, Durham, CT (US); Sanjeev Kumar Reddy Bollam, Hartford, CT (US); Shyam Munjuluri, Unionville, CT (US); Kiran K. Chennuri, Canton, CT (US)

(73) Assignee: AETNA INC., Hartford, CT (US)

( * ) Notice: Subject to any disclaimer, the term of this patent is extended or adjusted under 35 U.S.C. 154(b) by 0 days.

(21) Appl. No.: 15/599,173

(22) Filed: May 18, 2017

(65) Prior Publication Data

US 2018/0335946 A1 Nov. 22, 2018

(51) Int. Cl.
*G06F 16/903* (2019.01)
(52) U.S. Cl.
CPC .............................. *G06F 16/90339* (2019.01)
(58) Field of Classification Search
None
See application file for complete search history.

(56) References Cited

U.S. PATENT DOCUMENTS

| | | | |
|---|---|---|---|
| 6,108,658 A * | 8/2000 | Lindsay | ..................... G06F 7/22 |
| 8,868,573 B2 | 10/2014 | Chu et al. | |
| 9,268,796 B2 | 2/2016 | Pope et al. | |
| 2013/0218909 A1 * | 8/2013 | Chu | ....................... G06Q 10/10 |
| | | | 707/752 |
| 2016/0188705 A1 * | 6/2016 | Schreck | .............. G06F 16/2455 |
| | | | 707/748 |
| 2016/0246853 A1 | 8/2016 | Guirguis et al. | |

OTHER PUBLICATIONS

Zhang et al., A Fast Algorithm for Approximate Quantiles in High Speed Data Streams, IEEE, 9 pages (Year: 2007).*
Fusu, Pavel, Finding the Median in Large Sets of Numbers Split Across 1000 Servers, retrieved from https://web.archive.org/web/20130912224317/http://www.fusu.us/2013/07/median-in-large-set-across-1000-servers.html on Jan. 31, 2019, 4 pages (Year: 2013).*
Balouch, "Optimization of position finding step of PCMoMaRS Algorithm with statistical information," *International Arab Conference on Information Technology ACIT '2015* (8 pgs). http://acit2k.org/ACIT/images/stories/year2014/month1/acit2015/325.pdf .
Balouch, "Optimization of position finding step of PCMoMaRS Algorithm with statistical information," *The International Arab Journal of Information Technology*, vol. 13, No. 1A, pp. 208-214 (2016).

(Continued)

*Primary Examiner* — Gary W. Cygiel
(74) *Attorney, Agent, or Firm* — Leydig, Voit & Mayer, Ltd.

(57) ABSTRACT

A computing system for big data processing includes: a first node, configured to execute a central driver program; and a plurality of data and/or computing nodes, configured to store a plurality of data blocks corresponding to a data set. The first node and the plurality of data and/or computing nodes form a distributed computing environment configured for determining an exact value for one or more desired quantiles for the data set.

20 Claims, 16 Drawing Sheets

(56) References Cited

OTHER PUBLICATIONS

Shrivastava et al., "Medians and Beyond: New Aggregation Techiques for Sensor Networks," *Proceedings of the 2nd International Conference on Embedded Networked Sensor Systems, SenSys'04*, Nov. 3-5, 2004, Baltimore, Maryland, pp. 239-249 (2004).
"Selection algorithm," (8 pgs) downloaded from Wikkipedia on Aug. 28, 2017 https://en.wikipedia.org/wiki/Selection_algorithm.

* cited by examiner

SCALABLE DISTRIBUTED COMPUTING SYSTEM FOR DETERMINING EXACT MEDIAN AND OTHER QUANTILES IN BIG DATA APPLICATIONS

BACKGROUND

Large business enterprises, including for example health insurance companies or healthcare providers, work with vast amounts of data that are continuously being generated and operated upon. Tools for profiling such vast amounts of data exist, but existing profiling tools lack the capability to efficiently find quantiles, such as an exact median.

Median and other quantiles—such as quartile, percentile and $k^{th}$ smallest value—are common metrics in characterizing data sets and have broad applications in scientific computing, database, data mining, data analysis and machine learning. Median and other quantiles like quartile and percentile are known to be more difficult to compute than several other metrics such as sum, count, mean, etc., and it becomes even more difficult to compute such quantiles in a distributed system where a massive amount of data is stored across multiple machines (sometimes hundreds or thousands of machines).

A median can be characterized as the $k^{th}$ smallest (or largest) element in a set of n elements where k is the $[(n+1)/2]^{th}$ smallest element (if n is odd) or k is the average between the $[n/2]^{th}$ smallest element and the $[(n/2)+1]^{th}$ smallest element (if n is even). The problem of computing a $k^{th}$ smallest (or largest) element of a list is known as a selection problem, and is solved by a selection algorithm. Determining a median is often considered the hardest case for a selection algorithm, and such selection algorithms have been extensively studied over the years, both in academia and in industry. Different selection algorithms have been developed, ranging from simple to complex, to account for different computing properties and constraints such as computation time, complexity, space and memory usage, accuracy, the number of iterations needed, the type of data (e.g., static data or streaming data), etc.

Existing methods of determining median and other quantiles in a distributed dataset can be divided into two main types of methods: 1) exact methods, and 2) approximation methods. The approximation methods are typically used because the exact methods are often resource intensive and are not feasible with given memory or time constraints for very large datasets. The exact methods often include iterative or recursive steps that involve reading source data multiple times, which is a very expensive operation in conventional systems. The trade-off between the accuracy and runtime performance is a key factor in choosing which method to use.

These existing methods are often rooted in algorithms that were originally intended to be performed on a single computer. For example, a simple and precise algorithm is to collect data into one machine, globally sort the data then select the median and other quantiles. However, sorting is a very expensive operation and collecting data into one machine is often not feasible for a large data set. And although enhancements have been made to improve performance by using various partial sorting strategies and partitioning strategies to select the $k^{th}$ smallest elements instead of sorting a whole list, such algorithms still need memory that is proportional to the amount of input data, and are not suitable for handling large data sets in general.

SUMMARY

In an exemplary embodiment, the invention provides a computing system for big data processing. The computing system includes: a first node, configured to execute a central driver program; and a plurality of data and/or computing nodes, configured to store a plurality of data blocks corresponding to a data set. The first node and the plurality of data and/or computing nodes form a distributed computing environment configured for determining an exact value for one or more desired quantiles for the data set. Determining the exact value for one or more desired quantiles for the data set comprises: determining an allocation of memory for the plurality of data blocks; loading respective data blocks of the data set onto respective memories of the plurality of data and/or computing nodes; aggregating numeric data of the data set to obtain value counts for unique values of the data set; determining a threshold and a maximum number of histogram bins based on a number of numeric columns of the data set and/or the allocation of memory; determining whether to initiate a histogram-building process based on a unique value count; and determining the exact value for one or more desired quantiles for the data set.

In another exemplary embodiment, the invention provides a method for big data processing. The method includes: determining, by a distributed big data processing system, an allocation of memory for a plurality of data and/or computing nodes of the distributed big data processing system; loading, by the distributed big data processing system, respective data blocks of the data set onto respective memories of the plurality of nodes; aggregating, by the distributed big data processing system, numeric data of the data set to obtain value counts for unique values of the data set; determining, by the distributed big data processing system, a threshold and a maximum number of histogram bins based on a number of numeric columns of the data set and/or the allocation of memory; determining, by the distributed big data processing system, whether to initiate a histogram-building process based on a unique value count; and determining, by the distributed big data processing system, the exact value for one or more desired quantiles for the data set.

In yet another exemplary embodiment, the invention provides one or more non-transitory computer-readable mediums having processor-executable instructions stored thereon for big data processing. The processor-executable instructions, when executed by one or more processors, facilitating performance of the following: determining an allocation of memory for a plurality of nodes; loading respective data blocks of the data set onto respective memories of the plurality of nodes; aggregating numeric data of the data set to obtain value counts for unique values of the data set; determining a threshold and a maximum number of histogram bins based on a number of numeric columns of the data set and/or the allocation of memory; determining whether to initiate a histogram-building process based on a unique value count; and determining the exact value for one or more desired quantiles for the data set.

DETAILED DESCRIPTION

Exemplary embodiments of the invention are able to efficiently determine the exact median and other quantiles for a large dataset in distributed computing systems. Additionally, exemplary embodiments of the invention are highly scalable and efficient both vertically and horizontally to handle very large datasets (e.g., with billions of rows, thousands of numeric columns and tens of terabytes in size).

In an exemplary embodiment, the invention utilizes a distributed histogram implementation in which a local histogram is created for each of a plurality of data blocks. The histogram is enhanced to include not only the value count but also the unique value count in each data bin. The quantile-containing data bin is identified in an iterative histogram-building process. When the unique value count in the quantile-containing data bin is under a certain threshold, the iterative process is terminated, and a final data scan is performed to bring all the unique values within the quantile-containing data bin back to a central driver program. Exact medians and other quantiles can be quickly and precisely determined based on the information collected in the histograms. Additionally, large numbers of histograms can be computed independently with massive parallelism, allowing for high throughput to be achieved by computing all the medians for all the columns all at once. Further, duplicates and floating point/double precision numbers are handled efficiently due to the use of the unique value counts.

In an exemplary embodiment, the invention utilizes the Apache Hadoop and Apache Spark eco-system. Apache Hadoop has the capability to store the massive data reliably at affordable prices on computer clusters, and Apache Spark has in-memory processing capability and is well-suited for an iterative and recursive type of workload. Thus, Apache Hadoop and Apache Spark in accordance with exemplary embodiments of the invention provide a scalable, distributed computing system that is able to efficiently determine exact medians and other quantiles in a very large data set.

Figure 1:
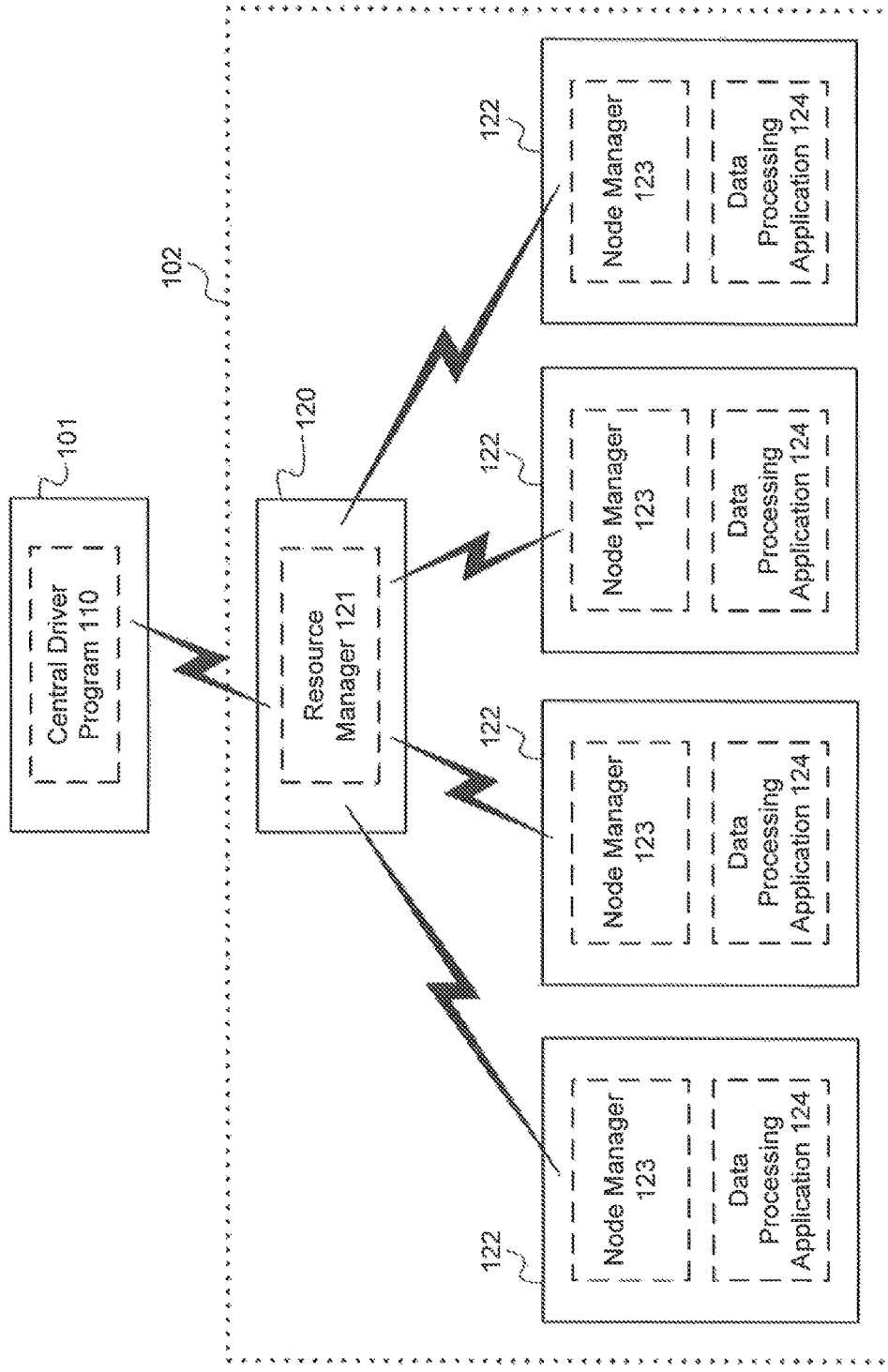
FIG. 1 is a block diagram illustrating an exemplary computing environment in which exemplary embodiments of the invention may be implemented.

FIG. 1 is a block diagram illustrating an exemplary computing environment in which exemplary embodiments of the invention may be implemented. The exemplary computing environment of FIG. 1 includes a plurality of computing/data nodes, each node comprising at least one processor and a non-transitory computer-readable medium having processor-executable instructions stored thereon for performing functions corresponding to the node. In this example, the nodes 122 are utilized as both computing nodes and data nodes, but it will be appreciated that in other exemplary implementations, the computing and data storage functionality may be performed on computing nodes and data nodes that are separate.

A central driver program 110 is executed on an edge node 101, which for example, may be an Apache Hadoop edge node. One exemplary cluster 102 of nodes is shown in communication with the edge node 101. The cluster 102 may be, for example, an Apache Hadoop/Spark cluster using YARN as the cluster resource management system. The resource manager 121 of the cluster 102, executed on a resource manager node 120, may be, for example, a Hadoop built-in master service that allocates and manages the cluster resources, and that communicates with the central driver program 110 and the node managers 123 in a plurality of nodes 122. A fraction of a node's capacity (managed by the node manager 123) is allocated as a container that is used for running a data processing application 124 (so as to serve as a computing node). The data processing applications 124 may include, for example, respective Apache Spark applications which facilitate repartitioning and shuffling of data, and/or respective histogram computing applications implemented on each node. Further, the data processing applications 124 may be an Apache Spark application running on a YARN-based Hadoop cluster. The nodes 122 may also include storage regions for storing the data of a large data set (so as to serve as a data node).

It will be appreciated that the exemplary environment shown in FIG. 1 is merely exemplary and for illustrative purposes, and that embodiments of the invention are not limited thereto. For example, a central driver program may be connected to a plurality of nodes in a distributed database system such as Oracle, or other types of distributed file systems and data stores such as Amazon S3, or a distributed system that data nodes and computing nodes are separated. Embodiments of the invention are also applicable to multi-threaded applications.

Figure 2A:
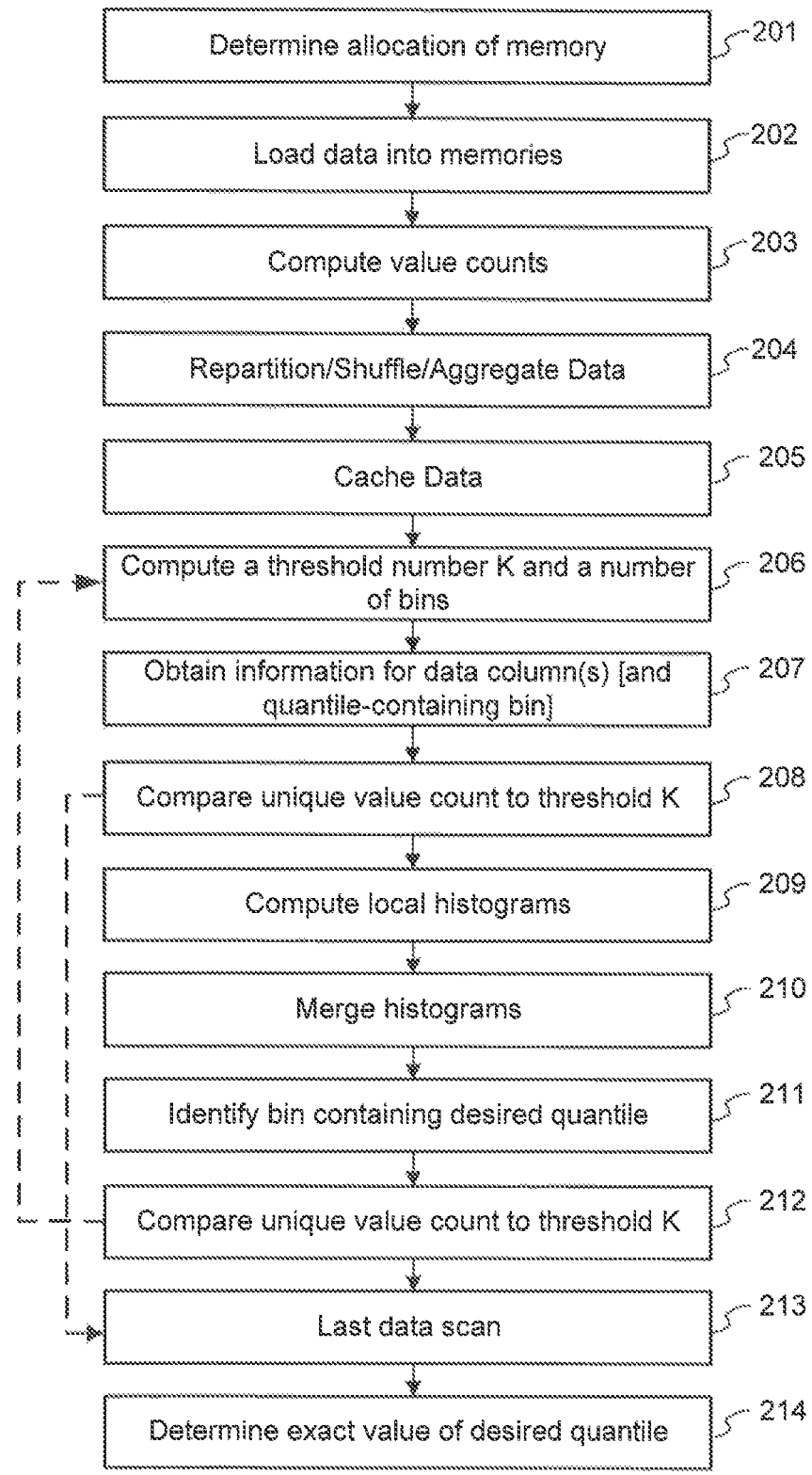
FIG. 2A is a flowchart illustrating a scalable and distributed process for determining an exact median or other quantile in a large dataset in accordance with an exemplary embodiment of the invention.

FIG. 2A is a flowchart illustrating a scalable and distributed process for determining an exact median or other quantile in a large dataset in accordance with an exemplary embodiment of the invention utilizing a central driver program and a large dataset distributed among a plurality of nodes.

At stage 201, the central driver program determines a fixed amount of system memory to be used for storing and processing histograms based on available system memory. This determination may be based on user input—for example, upon starting a program for determining an exact median or other quantile in a large dataset, a user may instruct the central driver program to use 10 to 200 MB of memory per data block. It will be appreciated that each data block may be 256 MB in size and each computing node may include up to hundreds of blocks or more (depends on the distribution of the data and the implementation of the computing environment). Different data block sizes, such as 64 MB or 128 MB, may be used in other exemplary implementations.

At stage 202, respective data from a large distributed dataset (such as a Hive table in accordance with Apache Hadoop or other types of big data storage such as HBase, Cassandra, etc. or traditional relational databases) is loaded into the respective memories of respective nodes (e.g., using Apache Spark). Apache Spark provides a highly efficient in-memory distributed computing framework, and Apache Hadoop provides a framework for storing massive datasets. In Hadoop, a large dataset is broken into many smaller data sets called "blocks," which are distributed to many nodes in a cluster. During a histogram computing process (as will be described below), each data block is loaded into the memory of a respective node in a block-by-block manner, and the process takes place simultaneously across multiple nodes of the computing environment.

At stage 203, each node computes respective partial aggregates of value-count pairs (e.g., in the format <column index, value, count>) while reading the data from the dataset.

At stage 204, the data may be shuffled, repartitioned, and aggregated into a number of new data blocks—for example, by using the Apache Spark system as implemented across multiple computing nodes. Shuffling and repartitioning the data causes a same value across all data blocks to be sent to a single data block to facilitate further aggregation. Shuffling and repartitioning the data also helps to avoid a skewed data distribution from the source data and potentially reduces usage of small files (which may cause inefficiencies), which allows for better balancing of the data set across available nodes. Additionally, shuffling and repartitioning greatly simplifies computation of a unique value count because, after shuffling and repartitioning, performing simple addition of the unique value counts of each data block allows the system to obtain the total unique value count (and the total unique value count may be used in exemplary embodiments of the invention to expedite convergence of the iterative quantile-finding process).

The aggregation performed in stage 203 and/or stage 204 includes aggregating the data in the form of value-count pairs such that the representation of the aggregated data is able to be many times smaller (e.g., thousands of times smaller) than the size of the original dataset. Consider, for example, a dataset with 1 billion rows containing "age" as one column. Before aggregation, the dataset has 1 billion values of age and takes up about 4 gigabytes (GB) of memory. After aggregation, it has around 100 age-count pairs and uses only approximately 1000 bytes of memory. Thus, because large datasets often contain many duplicated values, this aggregation allows for much less memory to be used and for the process to be highly efficient and scalable.

Figure 2B:
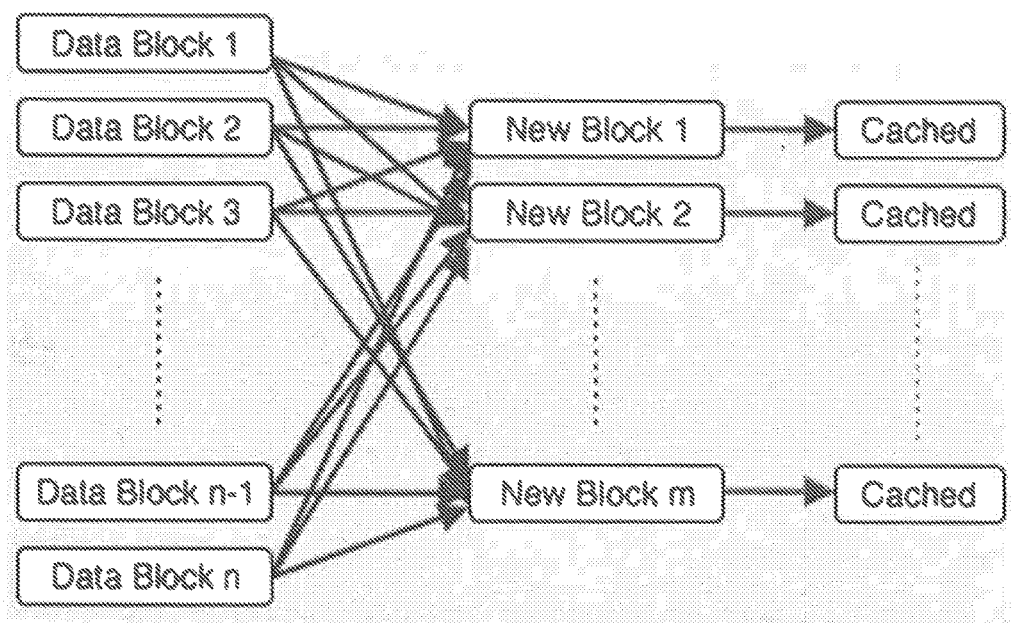
FIG. 2B is a schematic flow diagram illustrating n data blocks (corresponding to n partitions) being repartitioned/shuffled into m partitions and cached.

At stage 205, the repartitioned/shuffled/aggregated data blocks are cached in respective memories of the computing nodes. The caching may be performed, for example, using the in-memory distributed framework of Apache Spark, which greatly reduces the cost for performing multiple data scans. FIG. 2B illustrates n data blocks (corresponding to n partitions in Spark) being repartitioned/shuffled into m partitions and cached in accordance with stages 204 and 205.

At stage 206, the central driver program computes a threshold number K and a maximum number of histogram bins based on the available system memory allocated for storing histograms from stage 201 and the number of numeric columns in the dataset to be analyzed in parallel (which may be all of the numeric columns of the dataset). In an exemplary embodiment, for a database with column information stored in a metadata store such as Hive, the data type of each column and the number of numeric columns may be programmatically determined. The threshold number K may be computed, for example, using the following formula: total available memory for histogram per data block/(number of numeric columns×data size of one value count object×2). In an exemplary embodiment, the total available memory for histogram is set to 100 MB or $10^8$ bytes per data block, the memory needed for storing one value count is roughly 20 bytes (8 bytes for a Long data type plus object overhead). For a data set with 10 numeric columns, the threshold number K is $10^8/(10\times20\times2)=250000$. The threshold K provides a soft limit to control the memory usage by a histogram per data block. A small variation for the threshold K is allowed. For simplicity in an exemplary implementation, the maximum number of histogram bins may be set to be the threshold K.

At stage 207, during a first scan of the data, the minimum value, maximum value and value count for each column are computed at each node, and the results are collected at the central driver program. Other aggregates for data profiling, such as unique value count and average, may be computed at the same time. In subsequent iterations, information such as the minimum value, maximum value and value count for each data column of the entire data set is readily available from the first iteration, and additional information pertaining to a quantile-containing bin (e.g., minimum value, maximum value, total value count, cumulative preceding value count, and unique value count for the quantile-containing bin) is available from the previous iteration as well.

At stage 208, the central driver program compares the unique value count to the threshold number K. The unique value count is the unique value count of the data bin containing the desired quantile, with the exception of the very first iteration in which the total unique value count of the data set is used for the unique value count. If the unique value count is less than or equal to the threshold number K, the process proceeds to stage 213. Otherwise, the process continues to stage 209.

At stage 209, a local histogram is computed for each cached data block at each respective node based on the maximum number of histogram bins determined at stage 206, and the minimum value and maximum value of each data column obtained at stage 207 (the minimum value and maximum value for the entire data set in a very first iteration, or the minimum value and maximum value for the quantile-containing bin in a subsequent iteration). The value counts and unique value count are collected for each histogram data bin to build each local histogram. The unique value count for each histogram data bin is used in exemplary embodiments of the invention to terminate the iterative histogram-building process described herein at an earliest possible time and expedite convergence of the iterative histogram-building process. The larger the dataset and the larger the number of duplicated values therein (i.e., in cases with high value counts but small unique value counts), the greater the benefit.

At stage 210, multiple local histograms are merged at a data bin-level. For example, the $i^{th}$ value in the data bin of a first histogram is merged via addition with the $i^{th}$ value in the data bin of a second histogram. Merging of the histograms may be performed, for example, through multiple intermediate layers using Apache Spark's built-in treeReduce construct, which utilizes the processing capabilities of the plurality of nodes of the distributed computing environment. By using a hierarchical process for merging the histograms, bottlenecks may be avoided.

At stage 211, the bin containing the desired quantile (whether a median or another quantile) is identified by the central driver program, and the cumulative value count preceding the identified bin is tracked (e.g., the preceding cumulative value count may correspond to the number of data entries outside of the identified bin on one side).

At stage 212, if the central driver program determines that the unique value count in the identified bin is less than or equal to the threshold number K determined at stage 206, the process proceeds to stage 213. Otherwise, if the central driver program determines that the unique value count in the identified bin is greater than the threshold number K, the lower and upper bound of the identified bin containing the desired quantile will be used as the minimum and maximum value respectively in a new iteration of histogram-building process, and stages 206, 207, and 208, as well as stages 209, 210, 211 and 212, may be repeated for the data corresponding to the identified bin containing the desired quantile (resulting in further narrowed bins being used in this subsequent iteration). At subsequent iterations of stage 212, the unique value count in a further narrowed data bin is again compared to the threshold number K (which may have been re-computed in the subsequent iteration of stage 206) to determine whether to move on to stage 213 or perform another iteration of the histogram-building process. It will be appreciated that during iterations of the histogram-building process subsequent to the first iteration, information known from a previous iteration may be used—e.g., the minimum value, the maximum value, the value count and the unique value count for the identified bin. The cumulative value count preceding the identified bin is tracked as well at the central driver program.

At stage 213, a last data scan is performed to bring all the unique values in the form of (value, count) pairs within the identified bin containing the desired quantile (or within the dataset if stages 209-212 are not performed) to the central driver program.

At stage 214, the central driver program determines the exact value of the desired quantile. For example, for the (value, count) pairs received at the central driver program, which are sorted based on the "value" part of the pair, the "count" part of the pair is added to the preceding value count in the sequential order, until the cumulative value count is equal or greater than the value count of the desired quantile. The exact quantile such as median is found to be the "value" part of the current (value, count) pair. For example, in FIG. 3C discussed below, the central driver program received two (value, count) pairs (3.0, 8) and (4.0, 1) (sorted by the "value" part of the pair) in the identified bin. The preceding cumulative value count for the identified bin is 8 (tracked by the central driver program). The total value count is 25 (obtained in stage 207). The median is thus the $13^{th}$ value of the total value count of 25. To determine the median, the first value count 8 of the pair (3.0, 8) is added to the preceding value count 8. The sum is 16, which is greater than the expected median's value count 13. The value 3.0 in current pair (3.0, 8) is found to be the exact median. If the process had skipped to stage 213 from stage 208 on the first pass without performing any of stages 209-212 (e.g., in cases where numeric columns such as age or status code have a small number of unique values), the preceding cumulative value count is zero, and the median determination is performed as discussed above based on the entire data set sorted by "value."

It will be appreciated that the process depicted in FIG. 2A may be performed for multiple quantiles in parallel, providing high efficiency and scalability, and the result of the process shown in FIG. 2A (i.e., the exact value(s) of desired quantile(s)) may be outputted—e.g., by printing and/or saving the result.

Figure 3A:
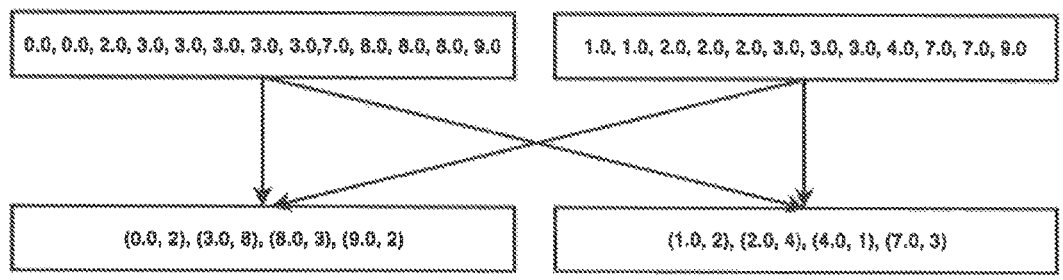
FIGS. 3A-3C are flowcharts illustrating a simplified example of determining an exact median or other quantile in a large dataset in accordance with an exemplary embodiment of the invention.
Figure 3B:
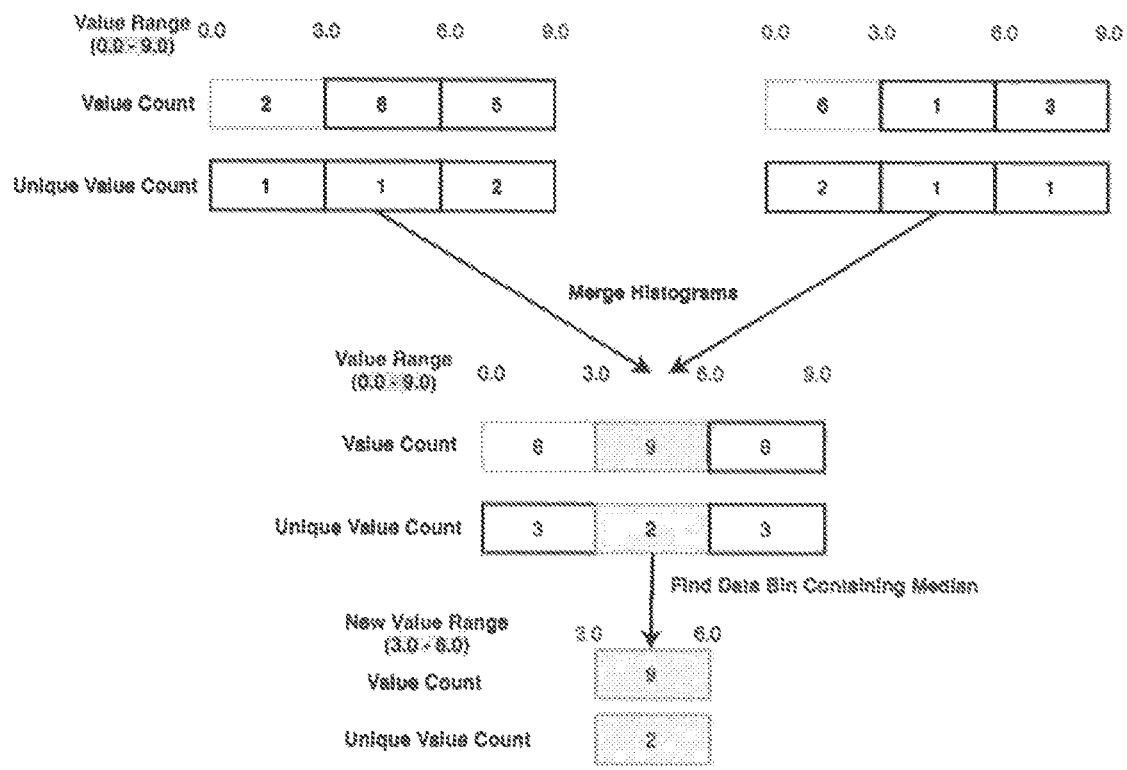
Figure 3C:
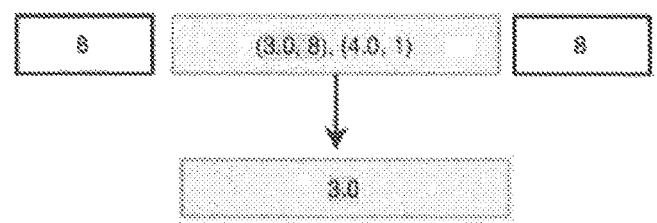

FIGS. 3A-3C provide a simplified example illustrating how the process shown in FIG. 2A may be used to find an exact median for a data set. FIG. 3A illustrates two blocks of source data (which may be, for example, a Hive table with a single column having 25 total decimal values)—the first comprising the values [0.0, 0.0, 2.0, 3.0, 3.0, 3.0, 3.0, 3.0, 7.0, 8.0, 8.0, 8.0, 9.0] and the second comprising the values [1.0, 1.0, 2.0, 2.0, 2.0, 3.0, 3.0, 3.0, 4.0, 7.0, 7.0, 7.0, 9.0]—being repartitioned, shuffled and aggregated in accordance with stages 203 and 204 of FIG. 2A into two new data blocks. The two new data blocks comprise value-count pairs, with the first new data block comprising [(0.0, 2), (3.0, 8), (8.0, 3), (9.0, 2)] and the second new data block comprising [(1.0, 2), (2.0, 4), (4.0, 1), (7.0, 3)]. These two new data blocks are cached in accordance with stage 205 of FIG. 2A. No particular value appears in both new data blocks after the repartition. It will be appreciated that the value count pairs may also have a column index associated with them, but the column index is not illustrated in FIG. 3A for simplicity of depiction.

For the purposes of this example, in accordance with stage 206 of FIG. 2A, the central driver program determines that the threshold number K is 2 and that a maximum number of data bins for a histogram is 3 based on a fixed amount of memory allocated for storing and processing histograms in accordance with stage 201 of FIG. 2A and based on there being one numeric column in the data set. Additionally, in accordance with stage 207 of FIG. 2A, the central driver program may determine in a first scan of the data that the minimum value is 0.0, the maximum value is 9.0, the total value count of entire data set is 25, and the total unique value count of entire data set is 8.

FIG. 3B illustrates a first iteration of the histogram-building process corresponding to stages 209 through stages 211 of FIG. 2A. Because the dataset has 8 total unique values (0.0, 3.0, 8.0, 9.0, 1.0, 2.0, 4.0, 7.0), the total unique value count is determined by the central driver programs as being greater than K in accordance with stage 208 of FIG. 2A, and local histograms are computed in accordance with stage 209 of FIG. 2A. As shown in FIG. 3B, the total value range of 0.0-9.0 is divided into 3 bins, the first bin including values greater than or equal to 0.0 and less than 3.0, the second bin including values greater than or equal to 3.0 and less than 6.0, and the third bin including values greater than or equal to 6.0 and less than or equal to 9.0. Thus, the computed local histogram that corresponds to the first data block [(0.0, 2), (3.0, 8), (8.0, 3), (9.0, 2)] includes 2 values and 1 unique value in the first bin ([(0.0, 2)]), 8 values and 1 unique value in the second bin ([(3.0, 8)]), and 5 values and 2 unique values in the third bin ([(8.0, 3), (9.0, 2)]). The computed local histogram that corresponds to the second data block [(1.0, 2), (2.0, 4), (4.0, 1), (7.0, 3)] includes 6 values and 2 unique values in the first bin ([(1.0, 2), (2.0, 4)]), 1 value and 1 unique value in the second bin ([(4.0, 1)]), and 3 values and 1 unique value in the third bin ([(7.0, 3)]). It will be appreciated that although the threshold number and maximum number of bins in this example are small for illustrative purposes, in practice, with an allocation of memory of a few hundred MB per data block at stage 201 of FIG. 2A, the threshold number K may be much larger (e.g., in the range of the millions if there are only a few numeric columns).

After these two local histograms are merged in accordance with stage 210 of FIG. 2A, the merged histogram has 8 values and 3 unique values in the first bin ([(0.0, 2), (1.0, 2), (2.0, 4)]), 9 values and 2 unique values in the second bin ([3.0, 8), (4.0, 1)]), and 8 values and 3 unique values in the third bin ([(7.0, 3), (8.0, 3), (9.0, 2)]). These local histograms and the merged histogram may each be implemented, for example, as two arrays—one containing value counts for each data bin, and the other containing unique value counts for each data bin.

The central driver program then identifies the second bin of the merged histogram as containing the median in accordance with stage 211 of FIG. 2A (in this example, there are 25 total values, and the median, which is the 13$^{th}$ value (in other words, the value count of the median is 13 in a sorted value list), falls within the second bin, as it can be seen that the second bin contains 9 values, with 8 cumulative values preceding the second bin and 8 cumulative values succeeding the second bin). Since the unique value count in the identified bin is 2, which is not greater than the threshold value K (also 2), a last data scan is performed to bring the data in the form of (value, count) pairs from the identified data bin to the central driver program in accordance with stages 212 and 213 of FIG. 2A. FIG. 3C illustrates the data in the form of (value, count) pairs in the identified data bin and the determination of the exact median from the data in the identified data bin and the preceding cumulative value counts. The identified data bin, when sorted, includes [(3.0, 8), (4.0, 1)]. Since there are 25 total values, with 8 cumulative preceding values relative to the identified data bin, the "count" part from the first pair (3.0, 8) is added to the preceding value count 8, resulting in a value 16, which is greater than the expected median's value count 13. Thus, it is determined that the "value" part of the first pair in the sorted identified bin—i.e., 3.0—is the exact median, and the driver program can stop reading new (value, count) pairs. The "value" part of the current (value, pair)—i.e., 3.0—is the exact median for the data set in accordance with stage 214 of FIG. 2A. This exact median can then be output, printed and/or saved.

FIGS. 3D-3G provide another simplified example illustrating how the process shown in FIG. 2A may be used to find an exact median for a data set. The data set in this example is different from the data set for the example given in FIGS. 3A-3C, and, unlike the example given in FIGS. 3A-3C, the example given in FIGS. 3D-3G utilizes multiple iterations of the histogram building process discussed above in accordance with FIG. 2A.

Figure 3D:
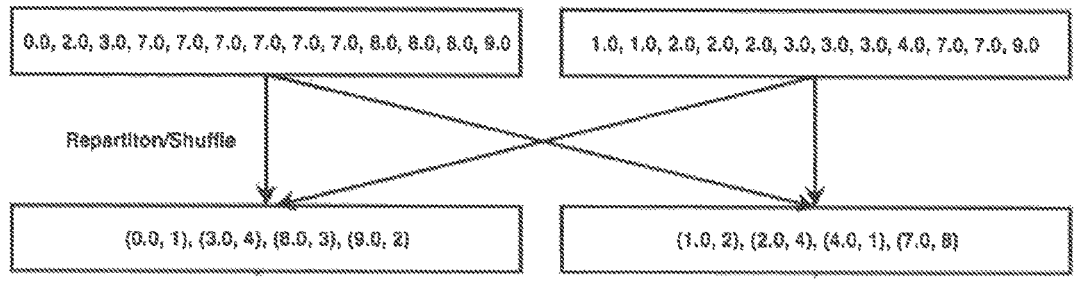
FIGS. 3D-3G are flowcharts illustrating another simplified example of determining an exact median or other quantile in a large dataset in accordance with an exemplary embodiment of the invention.

FIG. 3D illustrates two blocks of source data (which may be, for example, a Hive table with a single column having 25 total decimal values) being repartitioned, shuffled and aggregated in accordance with stages 203 and 204 of FIG. 2A into two new data blocks. The two new data blocks comprise value-count pairs. These two new data blocks are cached in accordance with stage 205 of FIG. 2A. It will be appreciated that the value count pairs may also have a column index associated with them, but the column index is not illustrated in FIG. 3D for simplicity of depiction.

For the purposes of this example, in accordance with stage 206 of FIG. 2A, the central driver program determines that the threshold number K is 2 and that a maximum number of data bins for a histogram is 3 based on a fixed amount of memory allocated for storing and processing histograms in accordance with stage 201 of FIG. 2A and based on there being one numeric column in the data set. Additionally, in accordance with stage 207 of FIG. 2A, the central driver program may determine in a first scan of the data that the minimum value is 0.0, the maximum value is 9.0, the total value count of the entire data set is 25, and the total unique value count of the entire data set is 8.

Figure 3E:
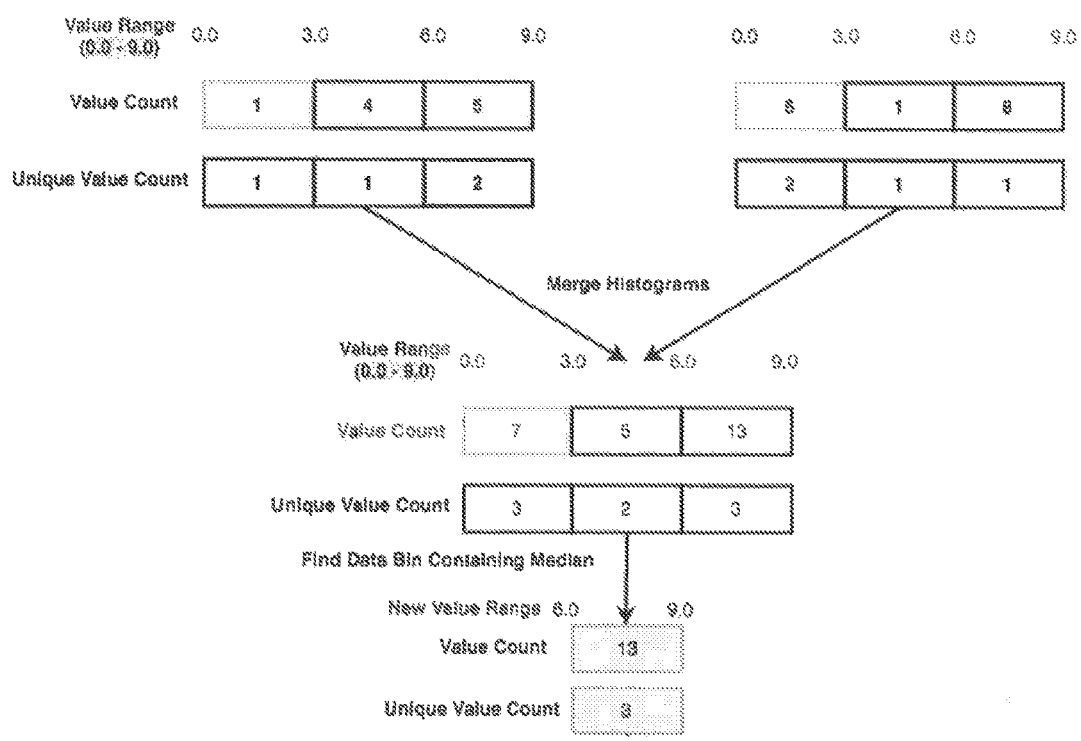
Figure 3F:
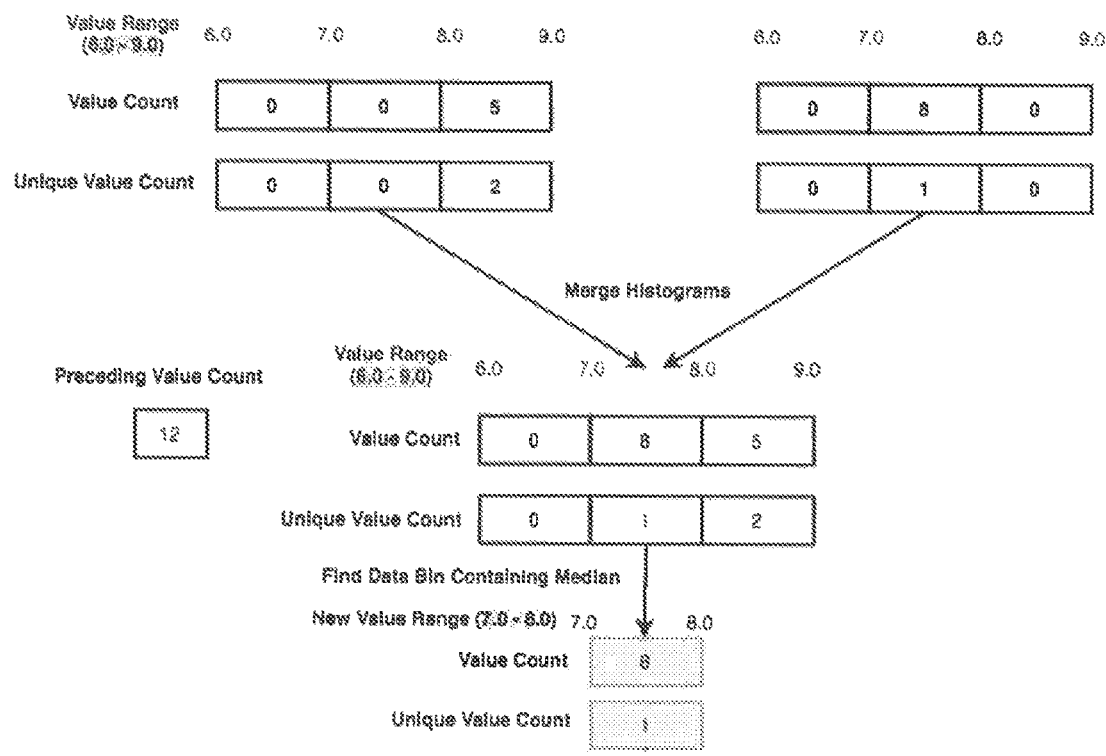
Figure 3G:
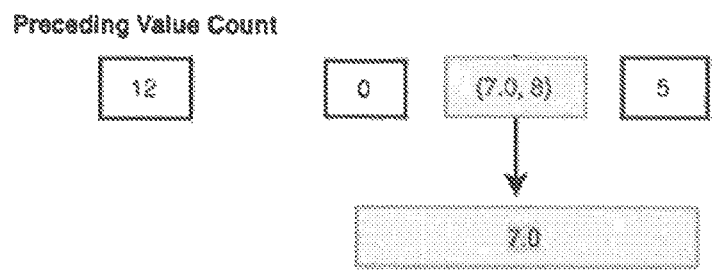

FIG. 3E illustrates a first iteration of the histogram building process. In this example, it is the third data bin (corresponding to values greater than or equal to 6.0 and less than or equal to 9.0) that contains the desired quantile, and the unique value count for the third data bin is 3, which is greater than K. Thus, a further iteration of the histogram building process is performed for the third data bin, which is treated as a data set with a minimum value of 6.0, a maximum value 9.0, a value count of 13, and a unique value count of 3. The information regarding total value count of entire data set (25) and the cumulative preceding value count (12) are maintained by the central driver program as well. FIG. 3F illustrates a second iteration of the histogram building process with respect to the third data bin from the first iteration, which corresponds to a value range from 6.0 to 9.0. In the second iteration of the histogram building process, the central driver program identifies the second bin of the second iteration (corresponding to values greater than or equal to 7.0 and less than 8.0), as containing the desired quantile (e.g., based on the preceding value count and the value counts for the current bins in view of the total value count). The identified data bin contains only one unique value count, which is less than the threshold K. The histogram building process is thus terminated, and, as shown in FIG. 3G, a final data scan is performed to bring back the (value, count) pair ((7.0, 8) in the example) to the central driver program, and the exact median is determined to be 7.0.

It will be appreciated that although the examples herein are described with respect to using a preceding cumulative value count with the values sorted in ascending order, in other exemplary implementations, a preceding or succeeding cumulative value count may be used, and values may be sorted in ascending or descending order.

Figure 4:
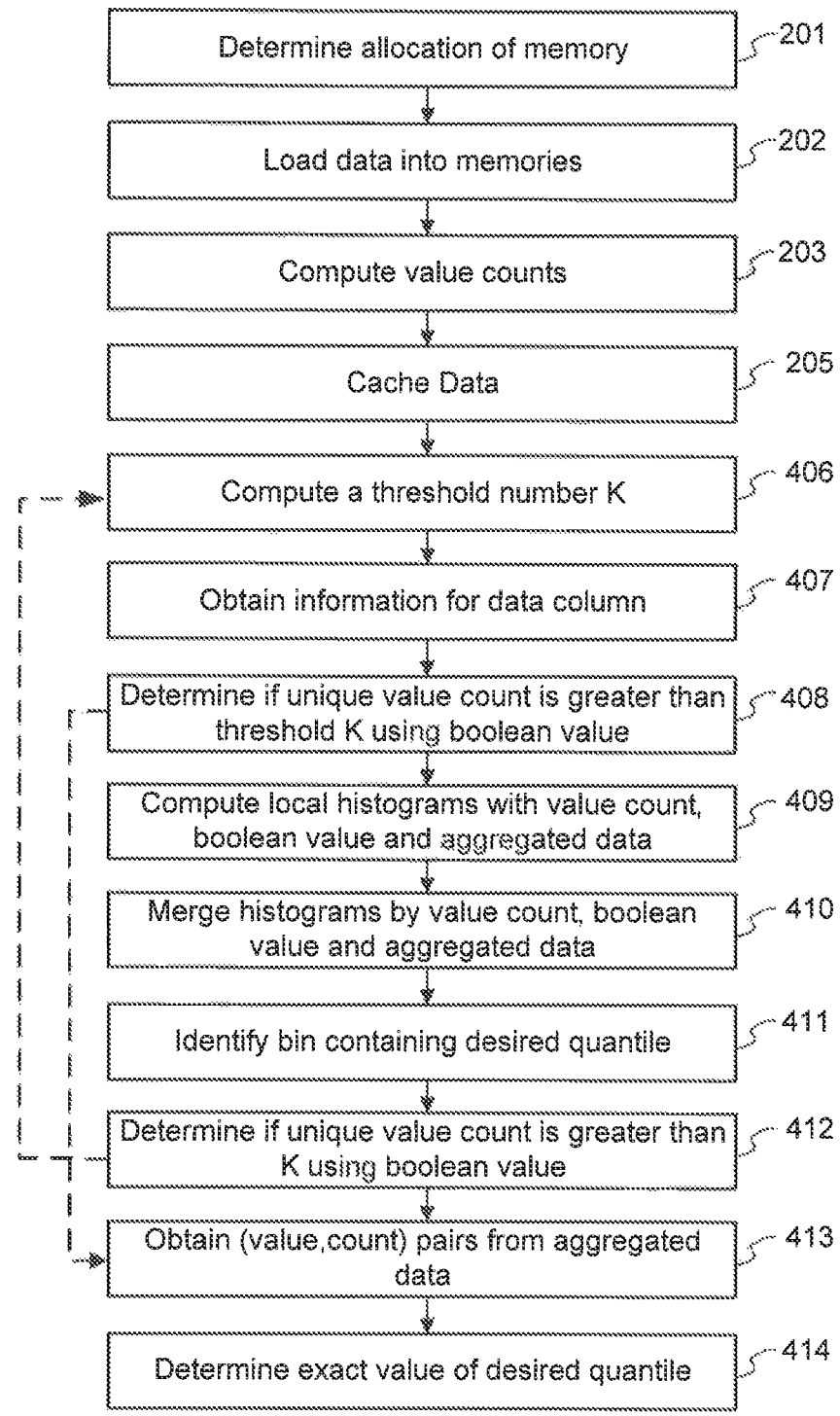
FIG. 4 is a flowchart illustrating a scalable and distributed process for determining an exact median or other quantile in a large dataset in accordance with another exemplary embodiment of the invention.

FIG. 4 is a flowchart illustrating a scalable and distributed process for determining an exact median or other quantile in a large dataset in accordance with another exemplary embodiment of the invention utilizing a central driver program and a large dataset distributed among a plurality of computing nodes. In the process shown in FIG. 4, unlike FIG. 2A, the step of shuffling, repartitioning and aggregating the data corresponding to stage 204 of FIG. 2A is not performed. Although shuffling, repartitioning and aggregating the data (as discussed above with respect to stage 204 of FIG. 2A) is generally preferred whenever feasible, there are some situations where doing so may not be necessary or may not be feasible (e.g., when it is known beforehand that the dataset is already well-distributed, in the case of streaming data, and/or in the case of a system implementation that does not support shuffling, repartitioning, and/or aggregating).

At stage 201, the central driver program determines a fixed amount of system memory to be used for storing and processing histograms based on available system memory. At stage 202, respective data from a large distributed dataset, such as a Hive table in accordance with Apache Hadoop, is loaded into the respective memories of respective nodes (e.g., using Apache Spark). At stage 203, each node computes respective partial aggregates of value-count pairs (e.g., in the format <column index, value, count>) while reading the data from the dataset. At stage 205, the partially aggregated data blocks are cached in respective memories of the computing nodes.

At stage 406, the central driver program computes a threshold number K and a maximum number of histogram bins based on the available system memory allocated for storing histograms from stage 201 and the number of numeric columns in the dataset. In an exemplary embodiment, for a database with column information stored in a metadata store such as Hive, the data type of each column and the number of numeric columns may be programmatically determined. The threshold number K may be computed, for example, using the following formula: the square root of (total available memory for histogram per data block/(number of numeric columns×data size of one value count object×2)). In an exemplary embodiment, the total available memory for histogram is set to 100 MB or 10$^8$ bytes per data block, the memory needed for storing one value count is roughly 20 bytes (8 bytes for a Long data type plus object overhead). For a data set with 10 numeric columns, the threshold number K is the square root of $(10^8/(10\times20\times2))=500$. The threshold K provides a soft limit to control the memory usage by a histogram per data block. A small variation for the threshold K is allowed. For simplicity in an exemplary implementation, the maximum number of histogram bins may be set to be the threshold K.

At stage 407, during a first scan of the data, the minimum value, maximum value and value count for each column is computed at each node, and the results are collected at the central driver program. Other aggregates for data profiling, such as average, may be computed at the same time. In subsequent iterations, information such as the minimum value, maximum value, total value count for each numeric column of the entire data set is readily available from the first iteration, and additional information pertaining to a quantile-containing bin (e.g., minimum value, maximum value, total value count, cumulative preceding value count) is available from the previous iteration as well.

At stage 408, the central driver program checks a Boolean value that indicates if the unique value count is greater than the threshold number K. The exact unique value count in this example is not available (due to shuffling/repartition not being performed), so in the first iteration, the Boolean value is set to True (or, alternatively, a total possible number of unique value counts is determined from adding together the local unique value counts and the total possible number is compared to the threshold number K). In subsequent iterations, the Boolean value from the previous iteration is carried over, which indicates if the unique value count is greater than a threshold number K in the previous iteration. If the unique value count is less than or equal to the threshold value K, the process proceeds to stage 413. Otherwise, the process continues to stage 409.

At stage 409, a local histogram is computed for each cached data block at each respective node based on the maximum number of histogram bins determined at stage 406, and the minimum value and maximum value of each data column determined at stage 407. The value counts and local unique value counts are collected for each histogram data bin for each data block. The local unique value count in each data block is compared to the threshold value K determined in the current iteration of stage 406. A Boolean array is generated to indicate if the local unique value count for each data bin is greater than the threshold value K. If any of the values in the Boolean array is False (which means that the local unique value count for the data bin is less than or equal to the threshold value K), the (value, count) pairs falling within that particular data bin are saved in a temporary data structure such as a HashMap. There will be at most K such pairs in any data bin so that only a limited small amount of memory will be used.

At stage 410, multiple local histograms are merged at a data bin-level. The merge logic for the process of FIG. 4 is different from the merge logic for the process of FIG. 2A. The value count is merged in the same way via addition logic for the corresponding data bins. The unique value count is not used in the merge. Instead, the Boolean array is merged using Boolean OR logic. The temporary data structure (e.g., the HashMap) are merged based on the "value" part of the (value, count) pairs. Two (value, count) pairs with identical "value" will be merged into one (value, count) pair in which the "count" part is the sum of the "counts" for the two pairs. For example, in FIG. 5B discussed below, the pair (2.0, 1) stored in the HashMap from the first histogram is merged with the pair (2.0, 3) stored in the HashMap from the second histogram to form the merged pair (2.0, 4). The merged HashMap is evaluated again to check if the number of (value, count) pairs in each data bin is greater than the threshold value K. If the condition is True (which means that the unique value count for the data bin is greater than the threshold value K), the corresponding Boolean value in the Boolean array is updated to True, and the corresponding (value, count) pairs are removed from the data structure to free up memory. Merging of the histograms may be performed, for example, through multiple intermediate layers using Apache Spark's built-in treeReduce construct. At the end of the merge, the data collected at the central driver program includes one array of value counts, one array of Boolean values and one data structure (e.g., a HashMap) holding a set of (value, count) pairs.

At stage 411, which is similar to stage 211 of FIG. 2A, the bin containing the desired quantile (whether a median or another quantile) is identified by the central driver program, and the cumulative value count preceding the identified bin is tracked (e.g., the preceding cumulative value count may correspond to the number of data entries outside of the identified bin on one side).

At stage 412, the central driver program uses the values in the Boolean array to determine if the unique value count in the identified bin is less than or equal to the threshold number K determined at stage 406. If the unique value count in the identified bin is less than or equal to the threshold number K (based on the value in the Boolean array corresponding to False), the process proceeds to stage 413. Otherwise, if the central driver program determines that the unique value count in the identified bin is greater than the threshold number K (based on the value in the Boolean array corresponding to True), the lower and upper bound of the identified bin containing the desired quantile will be used as the minimum and maximum value respectively in a new iteration of histogram-building process, and stages 406, 407, and 408, as well as stages 409, 410, 411 and 412 may be repeated for the data corresponding to the identified bin containing the desired quantile (resulting in further narrowed bins being used in the subsequent iteration). At subsequent iterations of stage 412, the central driver program uses the values in the Boolean array again to determine whether to move on to stage 413 or perform another iteration of the histogram-building process. It will be appreciated that during iterations of the histogram-building process subsequent to the first iteration, information known from a previous iteration may be used—e.g., the minimum value, the maximum value, the value count of the identified bin and the total value count of the entire data set. The cumulative value count preceding the identified bin is tracked as well at the central driver program.

At stage 413, the (value, count) pairs stored in the data structure (e.g., the HashMap) are used such that another data scan is not needed.

At stage 414, the central driver program determines the exact value of the desired quantile, which is similar to stage 214 of FIG. 2A. For example, for the (value, count) pairs received at the central driver program, which are sorted based on the "value" part of the pair, the "count" part of the pair is added to the preceding value count in the sequential order, until the cumulative value count is equal or greater than the value count of the desired quantile. The exact quantile such as median is found to be the "value" part of the current (value, count) pairs.

The result (i.e., the exact value of the desired quantile) may then be outputted—e.g., by printing and/or saving the result.

Figure 5A:
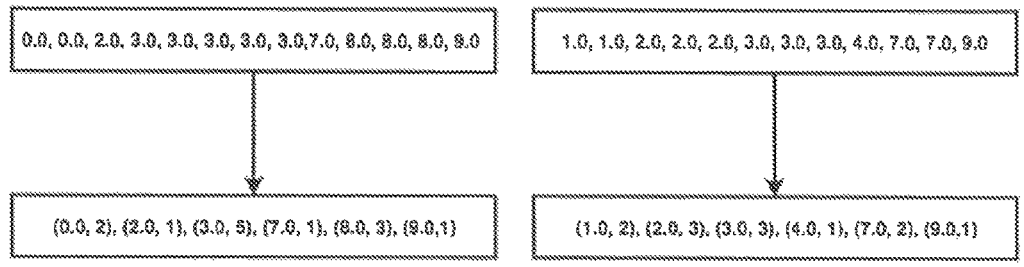
FIGS. 5A-5D are flowcharts illustrating a simplified example of determining an exact median or other quantile in a large dataset in accordance with an exemplary embodiment of the invention.

FIGS. 5A-5D provide a simplified example illustrating how the process shown in FIG. 4 may be used to find an exact median for a data set. FIG. 5A illustrates two blocks of source data (same source data as in FIG. 3A) (which may be, for example, a Hive table with a single column having 25 total decimal values)—the first comprising the values [0.0, 0.0, 2.0, 3.0, 3.0, 3.0, 3.0, 3.0, 7.0, 8.0, 8.0, 8.0, 9.0] and the second comprising the values [1.0, 1.0, 2.0, 2.0, 2.0, 3.0, 3.0, 3.0, 4.0, 7.0, 7.0, 7.0, 9.0]—being aggregated locally without repartition in accordance with stage 203 of FIG. 4. The two newly aggregated data blocks comprise value-count pairs, with the first new data block comprising [(0.0, 2), (2.0, 1), (3.0, 5), (7.0, 1), (8.0, 3), (9.0, 1)] and the second new data block comprising [(1.0, 2), (2.0, 3), (3.0, 3), (4.0, 1), (7.0, 2), (9.0, 1)]. Without repartition, some values such as 2.0, 3.0, 7.0 and 9.0 appear in both data blocks. These two new data blocks are cached in accordance with stage 205 of FIG. 4. It will be appreciated that the value count pairs may also have a column index associated with them, but the column index is not illustrated in FIG. 5A for simplicity of depiction.

For the purposes of this example, in accordance with stage 406 of FIG. 4, the central driver program determines that the threshold number K is 2 and that a maximum number of data bins for a histogram is 3 based on a fixed amount of memory allocated for storing and processing histograms in accordance with stage 201 of FIG. 4 and based on there being one numeric column in the data set. Additionally, in accordance with stage 407 of FIG. 4, the central driver program may determine in a first scan of the data that the minimum value is 0.0, the maximum value is 9.0, and the total value count of the entire data set is 25. Additionally, it will be appreciated that in the first iteration, the value count of the quantile-containing data bin is 25, and the cumulative preceding value count is 0, but these values may be obtained in subsequent iterations based on the previous iteration.

Figure 5B:
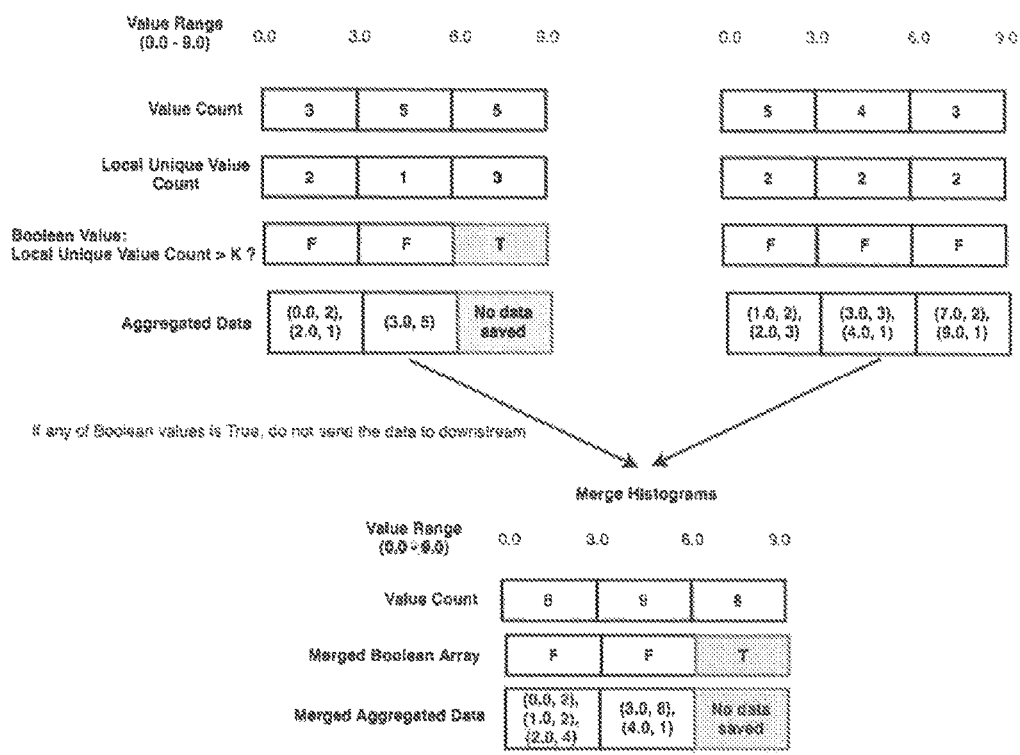
Figure 5C:
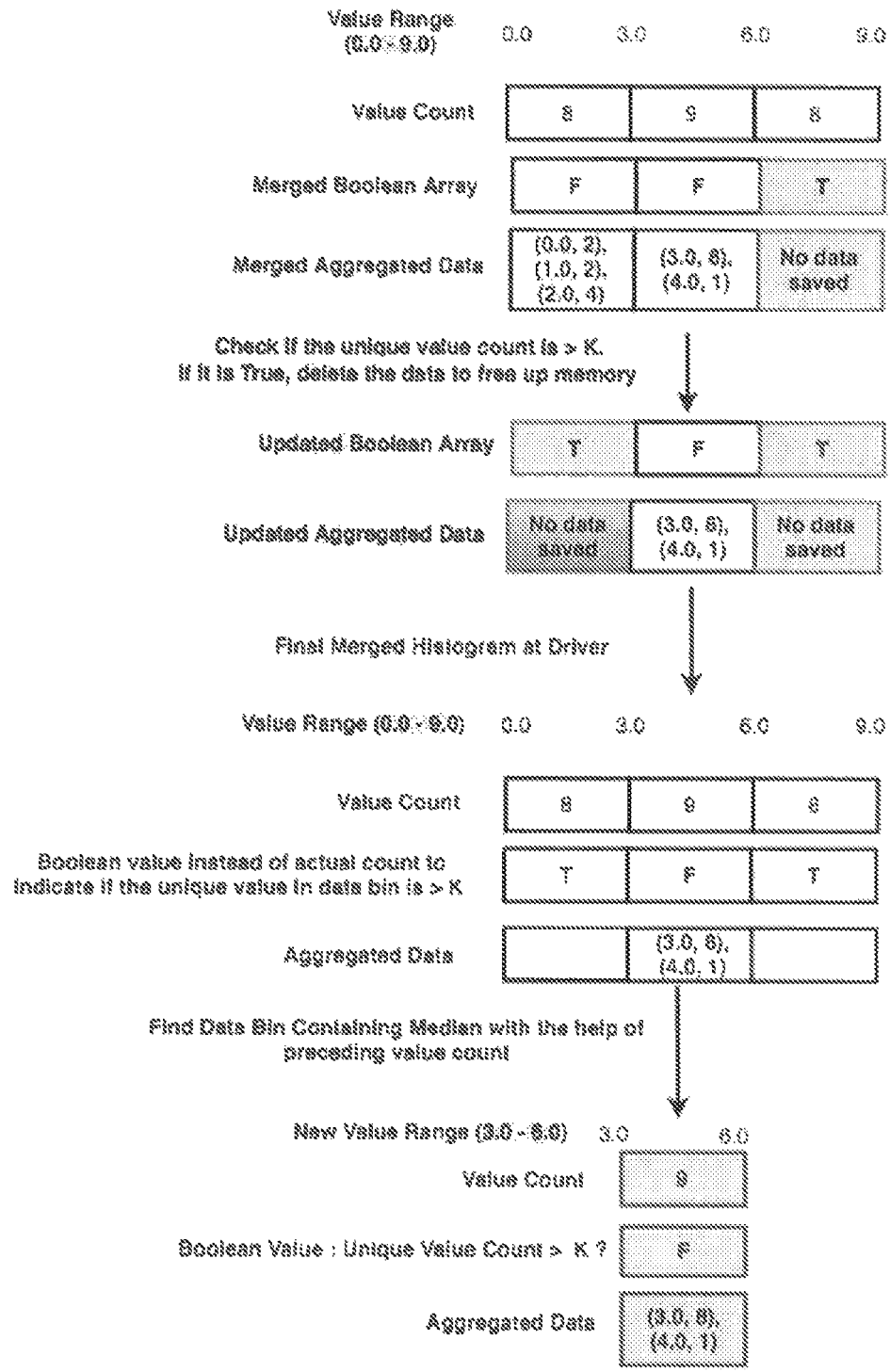

FIGS. 5B and 5C illustrate a first iteration of the histogram-building process corresponding to stages 409 through stages 411 of FIG. 4. Because it is the first iteration, the Boolean value that indicates if the unique value count is greater than the threshold number K is set to True (or, alternatively, a total possible number of unique value counts is determined from adding together the local unique value counts (6+6) and the total possible number (12) is compared to the threshold number K) in accordance with stage 408 of FIG. 4. Accordingly, local histograms are computed in accordance with stage 409 of FIG. 4. As shown in FIG. 5B, the total value range of 0.0-9.0 is divided into 3 bins, the first bin including values greater than or equal to 0.0 and less than 3.0, the second bin including values greater than or equal to 3.0 and less than 6.0, and the third bin including values greater than or equal to 6.0 and less than or equal to 9.0. Thus, the computed local histogram that corresponds to the first data block [(0.0, 2), (2.0, 1), (3.0, 5), (7.0, 1), (8.0, 3), (9.0, 1)] includes 3 values and 2 unique values in the first bin ([(0.0, 2), (2.0, 1)]), 5 values and 1 unique value in the second bin ([(3.0, 5)]), and 5 values and 3 unique values in the third bin ([(7.0, 1), (8.0, 3), (9.0, 1)]). The computed local histogram that corresponds to the second data block [(1.0, 2), (2.0, 3), (3.0, 3), (4.0, 1), (7.0, 2), (9.0, 1)] includes 5 values and 2 unique values in the first bin ([(1.0, 2), (2.0, 3)]), 4 values and 2 unique values in the second bin ([(3.0, 3), (4.0, 1)]), and 3 values and 2 unique values in the third bin ([(7.0, 2), (9.0, 1)]). A Boolean value (stored in an array) is created for each data bin to indicate if the local unique value count in each data bin is greater than the threshold value K. If the Boolean value is False (which means that the local unique value count in the data bin is less than or equal to the threshold value K), the corresponding aggregated (value, count) pairs are stored in a data structure such as a HashMap. Using the first data block as an example, the Boolean value is False for the first data bin, False for the second data bin and True for the third data bin. The aggregated data from the first [(0.0, 2), (2.0, 1)] and second [(3.0, 5)] data bin are stored in a HashMap. It will be appreciated that although the threshold number and maximum number of bins in this example are small for illustrative purposes. In practice, with an allocation of memory of a few hundred MB per data block at stage 201 of FIG. 4, the threshold number K may be much larger.

After these two local histograms are merged in accordance with stage 410 of FIG. 4, the merged histogram has 8 values, 3 (value, count) pairs ([(0.0, 2), (1.0, 2), (2.0, 4)]), and a Boolean value False for the first bin; 9 values, 2 (value, count) pairs ([(3.0, 8), (4.0, 1)]) and a Boolean value False for the second bin; and 8 values, no (value, count) pairs, and a Boolean value True for the third bin. The Boolean value in the third bin is True because the corresponding Boolean value in the first data block is True and the two Boolean values are merged based on a Boolean OR operation.

As shown in FIG. 5C, the merged (value, count) pairs in each data bin are evaluated again to determine if the unique value counts in bins containing merged aggregated data are greater than the threshold value K. If a unique value count for a bin is greater than the threshold value K, the corresponding Boolean value in the Boolean array is updated to True, and the corresponding aggregated (value, count) pairs are deleted from the data structure (e.g., the HashMap). In the example shown in FIG. 5C, the first data bin in the merged histogram has 3 (value, count) pairs corresponding to 3 unique values, which is greater than the threshold K. Thus, the Boolean value in the first data bin is updated to True, and the 3 (value, count) pairs in the first data bin are deleted from the data structure. These local histograms and the merged histogram may each be implemented, for example, as two arrays—one containing value counts for each data bin, and the other containing Boolean values to indicate if the unique value count for each data bin is greater than the threshold value K. A data structure such as a HashMap may be implemented to temporarily hold the (value, count) pairs for data bins having less than K (value, count) pairs corresponding to unique values.

Figure 5D:
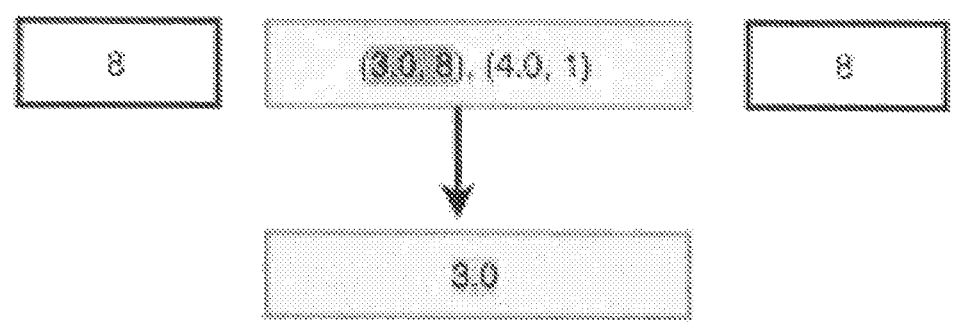

The central driver program identifies the second bin of the merged histogram as containing the median in accordance with stage 411 of FIG. 4 (in this example, there are 25 total values, and the median, which is the $13^{th}$ value (in other words, the median for the dataset will be $13^{th}$ in a sorted value list of 25 total values), falls within the second bin, as it can be seen that the second bin contains 9 values, with 8 cumulative values preceding the second bin and 8 cumulative values succeeding the second bin). Since the Boolean value in the identified bin is False, which means that the unique value count of the data bin is not greater than the threshold value K (which is 2), further iterations of the histogram-building process are not performed. Rather, the (value, count) pairs saved in the data structure such as HashMap for the identified data bin is used by the central driver program to determine the exact median in accordance with stages 412 through 414 of FIG. 4. And because the (value, count) pairs for the second bin are saved in the data structure (e.g., the HashMap), a scan of the data is not needed to determine the exact median at stage 414. FIG. 5D illustrates an example of determining the exact median from the (value, count) pairs saved in the data structure.

FIGS. 5E-5J provide another simplified example illustrating how the process shown in FIG. 4 may be used to find an exact median for a data set. The data set in this example is different from the data set for the example given in FIGS. 5A-5D, and, unlike the example given in FIGS. 5A-5D, the example given in FIGS. 5E-5J utilizes multiple iterations of the histogram building process discussed above in accordance with FIG. 4.

Figure 5E:
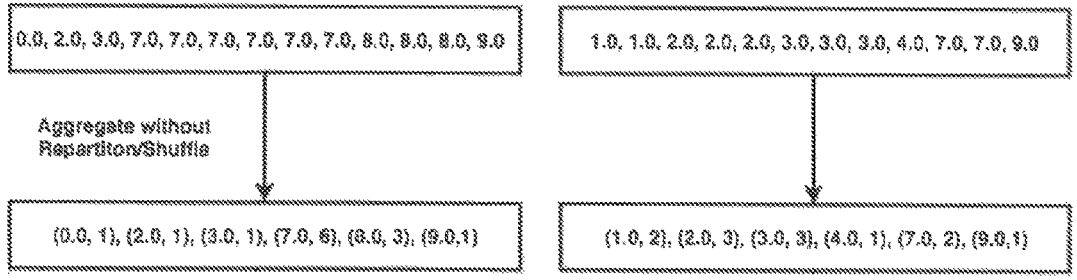
FIGS. 5E-5J are flowcharts illustrating another simplified example of determining an exact median or other quantile in a large dataset in accordance with an exemplary embodiment of the invention.

FIG. 5E illustrates two blocks of source data (same source data as in FIG. 3D) (which may be, for example, a Hive table with a single column having 25 total decimal values) being aggregated locally without repartition in accordance with stage 203 of FIG. 4. The two newly aggregated data blocks comprise value-count pairs. Without repartition, some values such as 2.0, 3.0, 7.0 and 9.0 appear in both new data blocks. These two new data blocks are cached in accordance with stage 205 of FIG. 4. It will be appreciated that the value count pairs may also have a column index associated with them, but the column index is not illustrated in Figure 5A for simplicity of depiction.

For the purposes of this example, in accordance with stage 406 of FIG. 4, the central driver program determines that the threshold number K is 2 and that a maximum number of data bins for a histogram is 3 based on a fixed amount of memory allocated for storing and processing histograms in accordance with stage 201 of FIG. 4 and based on there being one numeric column in the data set. Additionally, in accordance with stage 407 of FIG. 4, the central driver program may determine in a first scan of the data that the minimum value is 0.0, the maximum value is 9.0, and the total value count of the entire data set is 25. Additionally, in the first iteration, the value count of the quantile-containing data bin is 25, and the cumulative preceding value count is 0, but these values may be obtained in subsequent iterations based on the previous iteration.

Figure 5F:
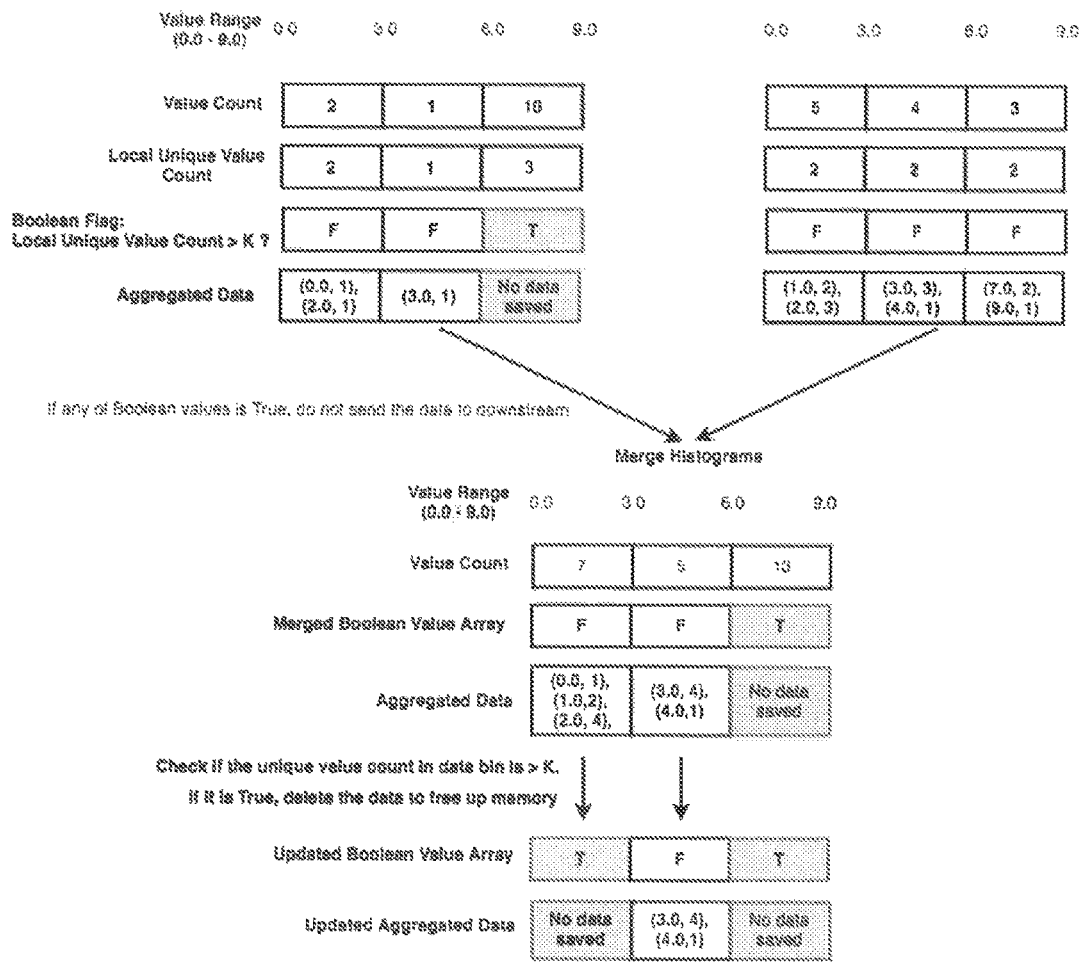
Figure 5G:
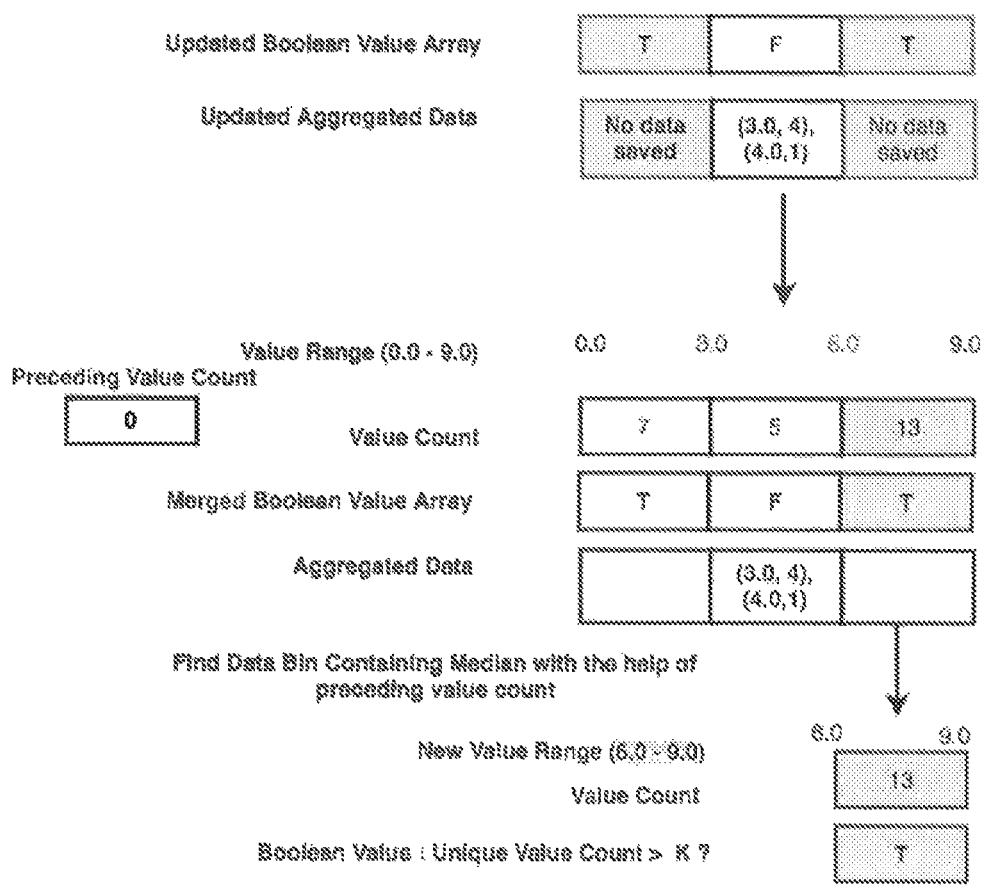

FIGS. 5F-5G illustrate a first iteration of the histogram building process. In this example, it is the third data bin (corresponding to values greater than or equal to 6.0 and less than or equal to 9.0) that contains the desired quantile, and the Boolean value for the third data bin is True. Thus, a further iteration of the histogram building process is performed for the third data bin, which is treated as a data set with a minimum value of 6.0, a maximum value 9.0, and a value count of 13. The information regarding total value count of the entire data set (25) and the cumulative preceding value count (12) are maintained by the central driver program as well.

Figure 5H:
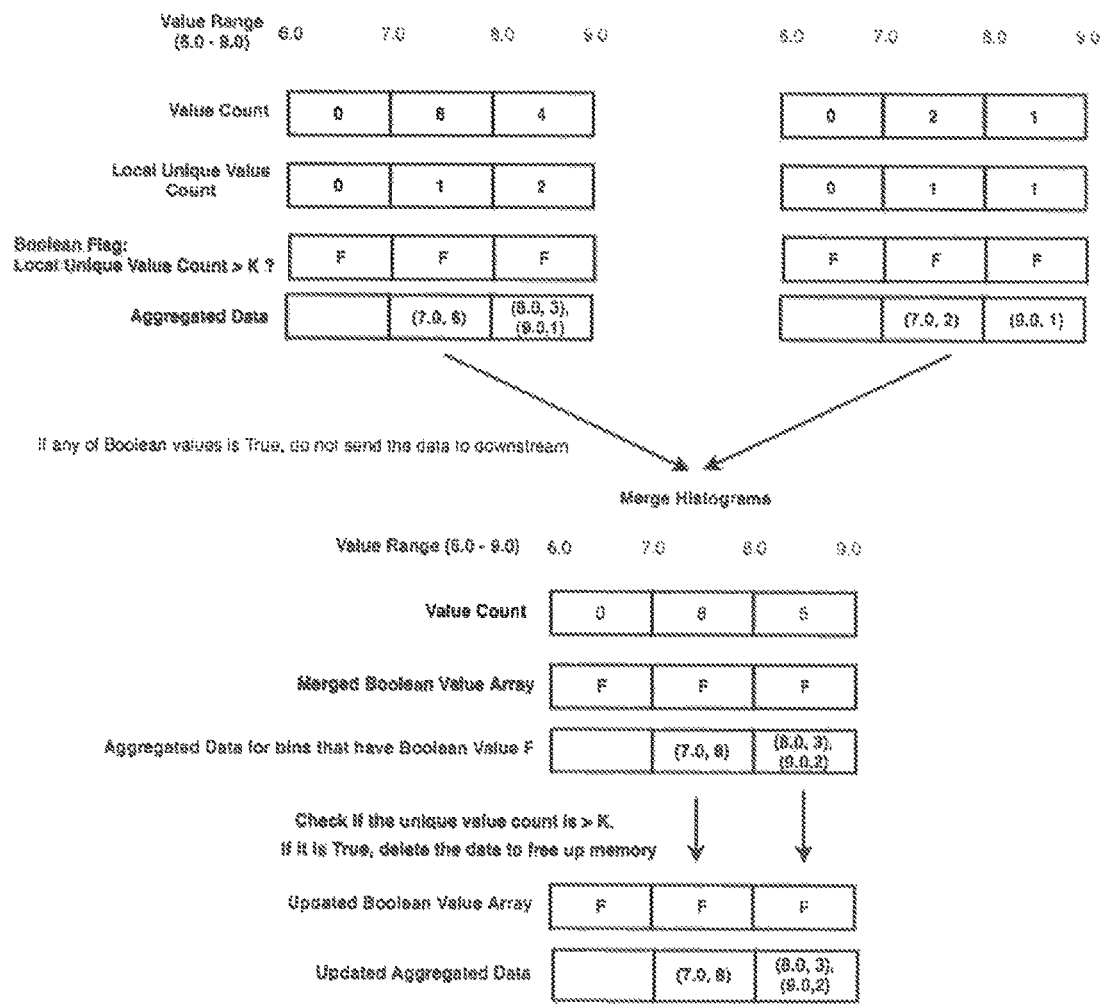
Figure 5I:
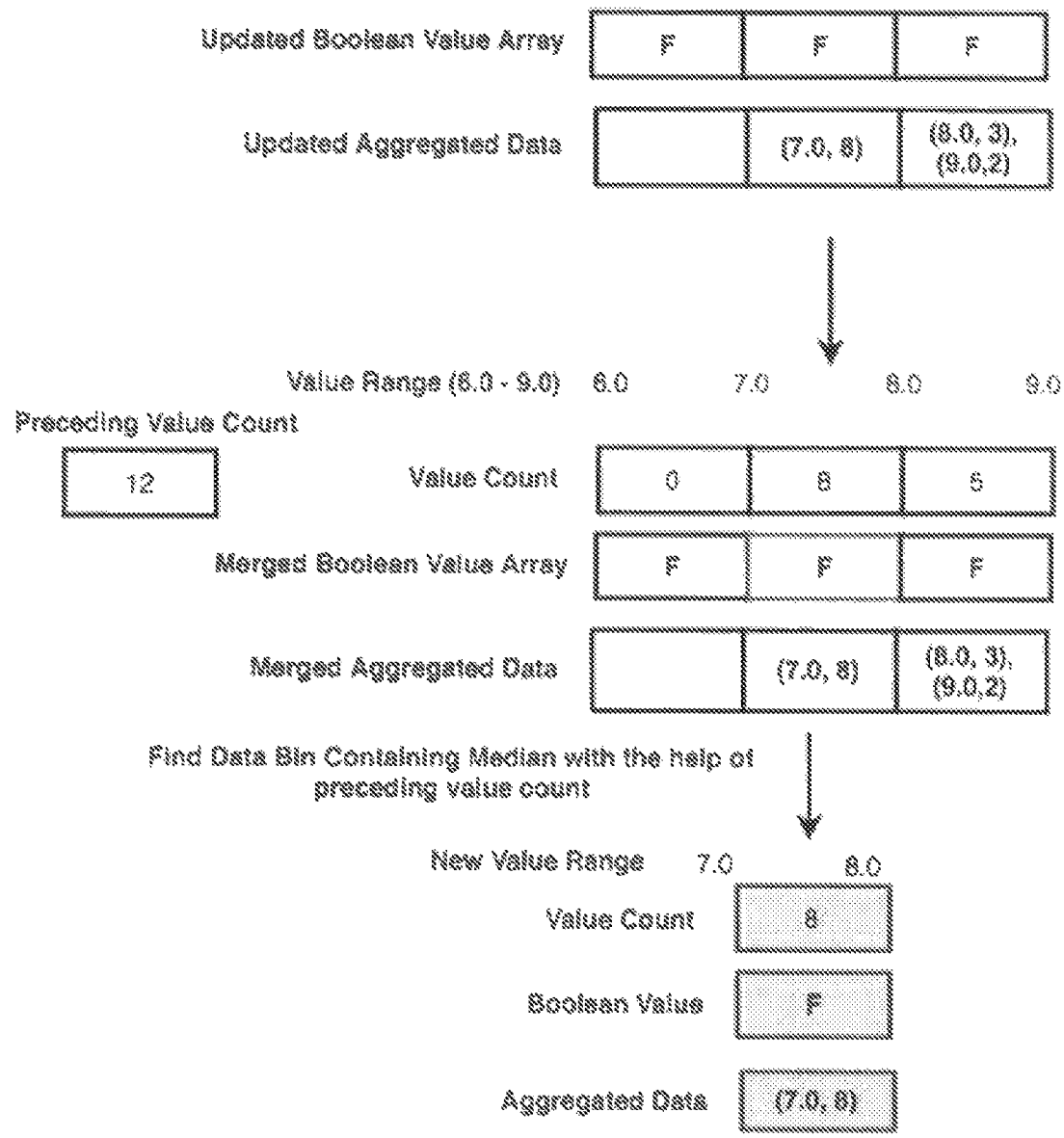
Figure 5J:
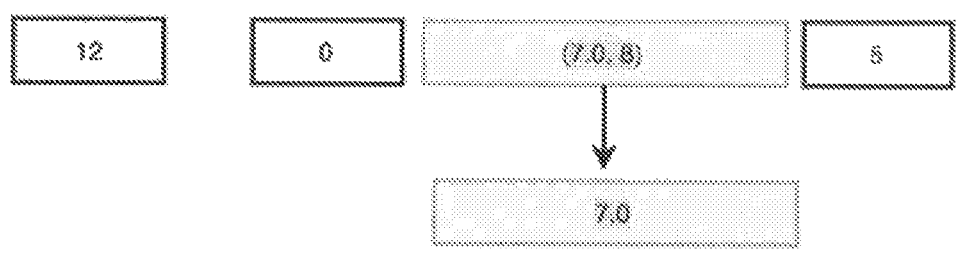

FIGS. 5H-5I illustrate a second iteration of the histogram building process with respect to the third data bin from the first iteration, which corresponds to a value range from 6.0 to 9.0. In the second iteration of the histogram building process, the central driver program identifies the second bin of the second iteration (corresponding to values greater than or equal to 7.0 and less than 8.0), as containing the desired quantile (e.g., based on the preceding value count and the value counts for the current bins in view of the total value count). The Boolean value for the identified data bin is False. The histogram building process is thus terminated, and, as shown in FIG. 5J, the exact median is determined to be 7.0 based on the aggregated data for the identified bin of the second iterations, which is stored in a data structure (e.g., a HashMap).

In practice, by utilizing unique value counts, exemplary embodiments of the invention provide a highly scalable (both with respect to data set size and/or number of database rows, as well as with respect to number of servers, concurrent jobs and/or number of numeric columns) and very efficient system for determining the exact median and other quantiles in a very large data set which is able to converge much faster than conventional systems. Exemplary embodiments of the invention are also able to provide very high throughput by computing all medians for all numeric columns in parallel, and are often able to find the exact medians along with other data profiling metrics in less than four iterations. In an exemplary implementation as a part of a big data profiler, the system was able to compute the medians for all the numeric columns and 19 other data profiling metrics (such as average and top 1000 values) in a multi-terabyte data set with billions of rows and thousands of columns in a few minutes, with each subsequent iteration taking less than 10 seconds (typically 6 seconds). In a particular example, the system was able to compute all medians of a table with 13220 numeric columns in less than two minutes. In another particular example, the system was able to find the exact median in a trillion numbers with 100 billion unique values in a generated single column table in less than 15 minutes.

In another example, a multi-threaded Java program was written in accordance with an exemplary embodiment of the invention to find the exact median in an integer array of 1 billion randomly generated values using a 4-core personal computer. The integer array was divided into 4 smaller arrays, and it took less than 10 seconds to find the exact median. For comparison, it took over 60 seconds using Java 8's efficient parallelSort method in Arrays, and over 270 seconds using Java 8's regular sort method in Arrays. Further, because a 4- to 8-core personal computer can offer only limited parallelism, greater performance gain can be achieved in a server that has many more cores. In yet another example, using a 20-core server, it took less than 3 seconds to find the exact median in an array of one billion integers. Thus, when applied to a massive distributed system with thousands of cores (e.g., a central processing unit (CPU)-based cluster or a graphical processing unit (GPU)-based cluster), exemplary embodiments of the invention can achieve tremendous efficiency and scalability through massive parallelism.

Further, exemplary embodiments of the invention are able to efficiently compute the exact median and other quantiles regardless of the numeric data type and the amount of duplicated values. All numeric types such as integer, long, floating point and double precision number are handled efficiently, and duplicated values in the data set are aggregated. As a result, less memory is used and a highly scalable solution is provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computing system for big data processing, the computing system comprising:
   a first node, configured to execute a central driver program; and
   a plurality of data and/or computing nodes, configured to store a plurality of data blocks corresponding to a data set;
   wherein the first node and the plurality of data and/or computing nodes form a distributed computing environment configured for determining an exact value for one or more desired quantiles for the data set, wherein determining the exact value for one or more desired quantiles for the data set comprises:
   determining an allocation of memory for the plurality of data blocks;
   loading respective data blocks of the data set onto respective memories of the plurality of data and/or computing nodes;
   aggregating numeric data of the data set;
   determining a threshold and a maximum number of histogram bins based on a number of numeric columns of the data set and/or the allocation of memory;
   performing an iterative histogram-building process based on the determined threshold and the determined maximum number of histogram bins, wherein performing the iterative histogram-building process includes generating a plurality of histograms, wherein each histogram comprises a plurality of bins, wherein each bin of each histogram corresponds to a range of values and comprises a value count and a unique value count for the range of values, wherein a respective number of bins for each histogram does not exceed the determined maximum number of histogram bins, and wherein the determined threshold is used within the iterative histogram-building process to determine whether to perform a next iteration of the iterative histogram-building process; and
   determining, based on the iterative histogram-building process, the exact value for one or more desired quantiles for the data set.

2. The computing system according to claim 1, wherein determining the exact value for one or more desired quantiles for the data set further includes:
   performing a shuffling and repartitioning operation to group data corresponding to the same unique values in the same data blocks.

3. The computing system according to claim 2, wherein determining the exact value for one or more desired quantiles for the data set further includes:
   determining whether a total unique value count for the data set is greater than the threshold; and
   wherein performing the iterative histogram-building process in initialized based on the total unique value count being greater than the threshold.

4. The computing system according to claim 3, wherein each of the generated histograms corresponds to
   a respective data block at a respective node; and
   wherein performing the iterative histogram-building process further includes; merging the histograms using the plurality of data and/or computing nodes and the central driver program to generate a merged histogram, and identifying a bin of the merged histogram containing a desired quantile.

5. The computing system according to claim 4, wherein performing the iterative histogram-building process further includes:
   comparing a unique value count for the identified bin of the merged histogram to the threshold; and
   in response to determining that the unique value count for the identified bin of the merged histogram is greater than the threshold, initiating a next iteration of the iterative histogram-building process.

6. The computing system according to claim 1, wherein data corresponding to the same unique values are distributed among different data blocks when the iterative histogram-building process begins.

7. The computing system according to claim 6, wherein determining the exact value for one or more desired quantiles for the data set further includes:
   evaluating a parameter corresponding to whether a total unique value count is possibly greater than the threshold, or determining whether local unique value counts for respective data blocks are greater than the threshold; and
   wherein performing the iterative histogram-building process is initialized based on the evaluation or the local unique value counts being greater than the threshold.

8. The computing system according to claim 7, wherein each of the generated histograms corresponds to a
   respective data block at a respective node; and
   wherein performing the iterative histogram-building process further includes: merging the histograms using the plurality of data and/or computing nodes and the central driver program to generate a merged histogram, and identifying a bin of the merged histogram containing a desired quantile.

9. The computing system according to claim 8, wherein performing the iterative histogram-building process further includes:
   determining whether a unique value count for the identified bin of the merged histogram is greater than the threshold; and
   in response to determining that the unique value count for the identified bin of the merged histogram is greater than the threshold, initiating a next iteration of the iterative histogram-building process.

10. A method for big data processing, the method comprising:
   determining, by a distributed big data processing system, an allocation of memory for a plurality of nodes of the distributed big data processing system;
   loading, by the distributed big data processing system, respective data blocks of a data set onto respective memories of the plurality of nodes;
   aggregating, by the distributed big data processing system, numeric data of the data set;
   determining, by the distributed big data processing system, a threshold and a maximum number of histogram bins based on a number of numeric columns of the data set and/or the allocation of memory;
   performing, by the distributed big data processing system, an iterative histogram-building process based on the determined threshold and the determined maximum number of histogram bins, wherein performing the iterative histogram-building process includes generating a plurality of histograms, wherein each histogram comprises a plurality of bins, wherein each bin of each histogram corresponds to a range of values and comprises a value count and a unique value count for the range of values, wherein a respective number of bins for each histogram does not exceed the determined maximum number of histogram bins, and wherein the determined threshold is used within the iterative histogram-building process to determine whether to perform a next iteration of the iterative histogram-building process; and
   determining, by the distributed big data processing system, based on the iterative histogram-building process, an exact value for one or more desired quantiles for the data set.

11. The method according to claim 10, further comprising:
   performing a shuffling and repartitioning operation to group data corresponding to the same unique values in the same data blocks; and
   determining whether a total unique value count for the data set is greater than the threshold;
   wherein performing the iterative histogram-building process is initialized based on the total unique value count being greater than the threshold.

12. The method according to claim 10, wherein data corresponding to the same unique values are distributed among different data blocks when the iterative histogram-building process begins;
   wherein the method further comprises: evaluating a parameter corresponding to whether a total unique value count is possibly greater than the threshold, or determining whether local unique value counts for respective data blocks are greater than the threshold; and
   wherein performing the iterative histogram-building process is initialized based on the evaluation or the local unique value counts being greater than the threshold.

13. One or more non-transitory computer-readable mediums having processor-executable instructions stored thereon for big data processing, the processor-executable instructions, when executed by one or more processors, facilitating performance of the following:
   determining an allocation of memory for a plurality of nodes;
   loading respective data blocks of a data set onto respective memories of the plurality of nodes;
   aggregating numeric data of the data set;
   determining a threshold and a maximum number of histogram bins based on a number of numeric columns of the data set and/or the allocation of memory;
   performing an iterative histogram-building process based on the determined threshold and the determined maximum number of histogram bins, wherein performing the iterative histogram-building process includes generating a plurality of histograms, wherein each histogram comprises a plurality of bins, wherein each bin of each histogram corresponds to a range of values and comprises a value count and a unique value county for the range of values, wherein a respective number of bins for each histogram does not exceed the determined maximum number of histogram bins, wherein the determined threshold is used within the iterative histogram-building process to determine whether to perform a next iteration of the iterative histogram-building process; and
   determining, based on the iterative histogram-building process, an exact value for one or more desired quantiles for the data set.

14. The one or more non-transitory computer-readable mediums according to claim 13, wherein the processor-executable instructions, when executed, further facilitate:
   performing a shuffling and repartitioning operation to group data corresponding to the same unique values in the same data blocks.

15. The one or more non-transitory computer-readable mediums according to claim 14, wherein the processor-executable instructions, when executed, further facilitate:
   determining whether a total unique value count for the data set is greater than the threshold; and
   wherein performing the iterative histogram-building process is initialized based on the total unique value count being greater than the threshold.

16. The one or more non-transitory computer-readable mediums according to claim 15, wherein each of the generated histograms corresponds to a respective data block at a respective node; and
   wherein performing the iterative histogram-building process further includes:
   merging the histograms to generate a merged histogram, and identifying a bin of the merged histogram containing a desired quantile.

17. The one or more non-transitory computer-readable mediums according to claim 16, wherein performing the iterative histogram-building process further includes:
   comparing a unique value count for the identified bin of the merged histogram to the threshold; and
   in response to determining that the unique value count for the identified bin of the merged histogram is greater than the threshold, initiating a next iteration of the iterative histogram-building process.

18. The one or more non-transitory computer-readable mediums according to claim 13, wherein data corresponding to the same unique values are distributed among different data blocks when the iterative histogram-building process begins;
   wherein the processor-executable instructions, when executed, further facilitate: evaluating a parameter corresponding to whether a total unique value count is possibly greater than the threshold, or determining whether local unique value counts for respective data blocks are each greater than the threshold; and wherein performing the iterative histogram-building process is initialized based on the evaluation or the local unique value counts being greater than the threshold.

19. The one or more non-transitory computer-readable mediums according to claim 18, wherein each of the generated histograms corresponds to a respective data block at a respective node; and
   wherein performing the iterative histogram-building process further includes:
   merging the histograms to generate a merged histogram, and identifying a bin of the merged histogram containing a desired quantile.

20. The one or more non-transitory computer-readable mediums according to claim 19, wherein performing the iterative histogram-building process further includes:
   determining whether a unique value count for the identified bin of the merged histogram is greater than the threshold; and
   in response to determining that the unique value count for the identified bin of the merged histogram is greater than the threshold, initiating a next iteration of the iterative histogram-building process.

* * * * *